United States Patent
Kim et al.

(10) Patent No.: US 10,295,848 B2
(45) Date of Patent: May 21, 2019

(54) DISPLAY DEVICE HAVING COMPENSATED COMMON VOLTAGE

(71) Applicant: SAMSUNG DISPLAY CO., LTD., Yongin-si, Gyeonggi-Do (KR)

(72) Inventors: Dongin Kim, Suwon-si (KR); Jinkyu Park, Seoul (KR); Yohan Lee, Asan-si (KR); Kihoon Choi, Cheonan-si (KR); Hyunseok Hong, Asan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 4 days.

(21) Appl. No.: 15/655,169

(22) Filed: Jul. 20, 2017

(65) Prior Publication Data
US 2018/0024386 A1 Jan. 25, 2018

(30) Foreign Application Priority Data
Jul. 20, 2016 (KR) .................. 10-2016-0091768

(51) Int. Cl.
| | |
|---|---|
| *G09G 3/36* | (2006.01) |
| *G09G 3/30* | (2006.01) |
| *G02F 1/01* | (2006.01) |
| *G02F 1/1335* | (2006.01) |
| *F21V 8/00* | (2006.01) |
| *G09G 3/20* | (2006.01) |
| *H01L 51/50* | (2006.01) |
| *G02F 1/163* | (2006.01) |

(52) U.S. Cl.
CPC .......... *G02F 1/0123* (2013.01); *G02B 6/0011* (2013.01); *G02F 1/1335* (2013.01); *G09G 3/2092* (2013.01); *G09G 3/3655* (2013.01); *G02F 2001/1635* (2013.01); *G09G 2330/022* (2013.01); *G09G 2340/0435* (2013.01); *H01L 51/50* (2013.01)

(58) Field of Classification Search
CPC ....... G09G 2340/16; G09G 2340/0435; G09G 3/3655; G09G 2300/0876
See application file for complete search history.

(56) References Cited

U.S. PATENT DOCUMENTS

| | | | |
|---|---|---|---|
| 6,456,268 B1 | 9/2002 | Takeda | |
| 9,548,016 B2 | 1/2017 | Lee et al. | |
| 2012/0274624 A1* | 11/2012 | Lee | G09G 3/3648 345/213 |
| 2015/0049274 A1 | 2/2015 | Kim et al. | |

(Continued)

FOREIGN PATENT DOCUMENTS

| | | |
|---|---|---|
| KR | 10-2001-0015111 | 2/2001 |
| KR | 10-2008-0078454 | 8/2008 |

(Continued)

*Primary Examiner* — Sanghyuk Park
(74) *Attorney, Agent, or Firm* — F. Chau & Associates, LLC

(57) ABSTRACT

A display device includes: a display panel; a driving frequency converter circuit configured to convert a driving frequency according to an input image data. A common voltage controller outputs a common voltage data corresponding to the driving frequency; and a common voltage generator receives the common voltage data to generate a common voltage and outputs the common voltage to the display panel. The common voltage has an inclined waveform within an integer multiple of a frame period.

20 Claims, 7 Drawing Sheets

(56) References Cited

U.S. PATENT DOCUMENTS

| | | | |
|---|---|---|---|
| 2015/0103104 A1* | 4/2015 | Lee | G09G 3/3648 |
| | | | 345/690 |
| 2015/0279333 A1* | 10/2015 | Saitoh | G09G 3/20 |
| | | | 345/213 |
| 2016/0005368 A1 | 1/2016 | Park et al. | |

FOREIGN PATENT DOCUMENTS

| | | |
|---|---|---|
| KR | 10-2009-0069003 | 6/2009 |
| KR | 10-2015-0019849 | 2/2015 |
| KR | 10-2016-0005294 | 1/2016 |
| KR | 10-2016-0011818 | 2/2016 |

* cited by examiner

டுppDISPLAY DEVICE HAVING COMPENSATED COMMON VOLTAGE

CROSS-REFERENCE TO RELATED APPLICATION

This application claims priority under 35 U.S.C. § 119 from Korean Patent Application No. 10-2016-0091768, filed on Jul. 20, 2016, in the Korean Intellectual Property Office (KIPO), the disclosure of which is incorporated by reference herein.

1. TECHNICAL FIELD

Embodiments of the present inventive concept relate to a display device, and more particularly, to a display device that is capable of substantially minimizing flickering.

2. DISCUSSION OF RELATED ART

Display devices display an image with a light emitting element. In recent times, there has been a widespread use of flat panel display devices as display devices. There are various kinds of flat panel display devices, which may be classified into liquid crystal display ("LCD") devices, OLED ("OLED") display devices, plasma display panel ("PDP") devices, electrophoretic display devices and the like based on a light emitting scheme thereof.

One substrate of a display device generally includes a thin film transistor (TFT) used for switching a voltage applied to an electrode. In addition to the TFT, there is disposed on the TFT substrate a wiring including a gate line and a data line, and a gate driver and a data driver receive external signals and transmit the signals to the gate line and the data line, respectively. In a pixel area defined by an intersection of the gate line and the data line is disposed a pixel electrode that is electrically connected to the TFT. The display device may enhance the display quality of a moving image by switching, using the TFT, a data voltage applied to a display panel to actively control data.

In an example where the display device displays a still image, the display panel may be driven by a relatively low frequency. In the case of the relatively low frequency driving of the display panel, the power consumption of the display panel is relatively reduced as compared to the case of a typical 60 Hz or 120 Hz driving. In other words, the power consumption may be reduced because a previously displayed data is maintained for display without refreshing the data every frame and the driving frequency is selected according to the time at which the next data is refreshed.

On the other hand, the luminance decreases as the data voltage in the pixel decreases in the case of low frequency driving. For example, since the pixels are not refreshed for a relatively long time, the luminance is reduced due to the resultant residual DC component and the leakage current of the TFT. When data is refreshed in the succeeding frame, the luminance suddenly increases and such a luminance change is recognized as flickering. For example, in a significantly low frequency driving of less than about 30 Hz, such a change in luminance is largely generated and the flickering may be perceived more strongly.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the inventive concept may be directed to a display device capable of substantially minimizing the flicker phenomenon.

According to an embodiment, a display device includes: a display panel; a driving frequency converter circuit configured to convert a driving frequency according to an input image data; a common voltage controller configured to control output of a common voltage data corresponding to the driving frequency; and a common voltage generator configured to receive the common voltage data and generate a common voltage and output the common voltage to the display panel, wherein the generated common voltage has an inclined waveform within an integral multiple of a frame period.

The display panel may include: a plurality of gate lines; a plurality of data lines insulated from and intersecting the plurality of gate lines; a plurality of pixels electrically connected to the plurality of gate lines and the plurality of data lines; wherein the display panel displays an image comprised of an output of each pixel according to a gate signal applied through the plurality of gate lines, and a data voltage applied through the plurality of data lines, and a value of the common voltage decreases at a substantially similar rate during the integer multiple of the frame period.

The common voltage may gradually decrease within an integer multiple of the frame period.

The common voltage may gradually increase within an integer multiple of the frame period.

The integer multiple of the frame period may increase as the driving frequency decreases.

The display device may be driven by a first frequency when the image data is a moving image data and driven by a second frequency when the image data is a still image data.

The first frequency may be greater than the second frequency.

A difference between a maximum value and a minimum value of the common voltage may increase as the second frequency decreases.

The display device may further include a lookup table having the driving frequency and the common voltage data as variables.

The display device may further include a lookup table having the driving frequency, a gray scale and the common voltage data as variables.

The display device may further include a power management circuit unit outputting a driving voltage and a gamma voltage; a timing controller outputting an image data signal and a driving control signal; a data driver converting the image data signal into a data voltage signal based on the driving voltage, the gamma voltage and the driving control signal; and a gate driver outputting a gate signal based on the driving voltage and the driving control signal.

The data voltage signal may have a different polarity at every integer multiple of the frame period.

The data voltage signal and the common voltage may be refreshed at every integer multiple of the frame period.

In an embodiment of the inventive concept, a display device may include: a display panel including a plurality of gate lines and a plurality of data lines insulated from and intersecting the plurality of gate lines, and a plurality of pixels electrically connected to the plurality of gate lines and the plurality of data lines; a timing controller circuit configured to receive a digital image data and identify whether the digital image data comprises a still image data or a moving image data; a data driver circuit configured to convert the digital image data signal into analog image data signals applied to the plurality of data lines; a gate driver circuit configured to generate gate signals in response output to the plurality of gate lines; a power management integrated circuit (PMIC) configured to: output a driving voltage and a gamma voltage to the data driver circuit, output the gate driving voltages to the gate driver, and output a common voltage to the display panel; and the common voltage has an inclined waveform within an integer multiple of a frame period.

The display device may further include: a common voltage generator that generates the common voltage data having the inclined waveform; and wherein the timing controller is configured to receive the digital image data from an external source, and generate a common voltage data that is output to the common voltage generator; and the timing controller includes a still image determinator circuit that identifies whether the digital image data comprises a still image or a moving image, and a common voltage controller that receives the frequency information and outputs the common voltage data corresponding to the frequency information to the common voltage generator.

According to an embodiment of the inventive concept, the common voltage controller may retrieves from a memory a particular common voltage data corresponding to a particular driving frequency from among a plurality of driving frequencies based on the frequency information.

The memory may include a lookup table including at least the frequency information, gray scale information and the common voltage data as variables.

The common voltage data may comprise different inclined waveforms according to the corresponding driving frequency identified in the frequency information.

The display panel is driven by a first frequency when the image data is a moving image data and driven by a second frequency when the image data is a still image data, and a difference between a maximum value and a minimum value of the common voltage increases as the second frequency decreases.

According to an embodiment of the inventive concept, a non-transitory machine readable medium having stored thereon executable instructions to cause a display device to perform operations includes converting, by a driving frequency converter circuit, a driving frequency according to whether input image data is a still image; providing, by a common voltage controller, output data and gate control signals to data drivers and gate drivers including the driving frequency; providing a common voltage to a display panel in which the common voltage corresponds to the driving frequency, wherein the common voltage has an inclined waveform within an integer multiple of a frame period of an image displayed by the display panel.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

An appreciation of the inventive concept by a person of ordinary skill in the art will become more apparent by describing in detail embodiments thereof with reference to the accompanying drawings, wherein:

FIG. 5A is a view illustrating a luminance waveform before the common voltage is compensated for.

DETAILED DESCRIPTION

Figure 1:
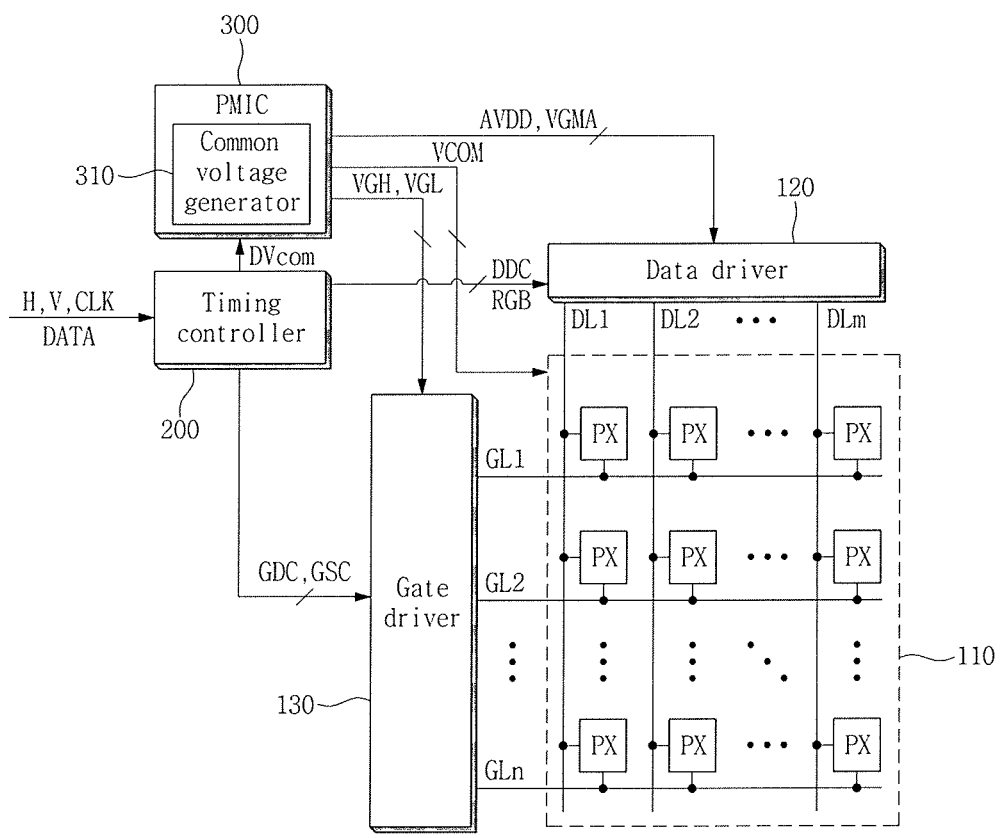
FIG. 1 is a block diagram illustrating a display device according to an embodiment of the inventive concept.

Embodiments of the inventive concept will now be described more fully hereinafter with reference to the accompanying drawings. As the inventive concept may be practiced so as to include modifications in various manners other than expressly shown, a person of ordinary skill should understand and appreciate that the inventive concept is not limited to the embodiments discussed herein. Accordingly, the scope of the appended claims is not limited to the embodiments and should be construed as including all the changes, equivalents and substitutions included in the spirit and scope of the inventive concept.

The elements shown in the drawings may not be to scale. For example, thicknesses of a plurality of layers and areas may be illustrated in an enlarged manner for clarity and ease of description thereof. When a layer, area, or plate is referred to as being "on" another layer, area, or plate, it may be arranged directly on the other layer, area, or plate, or there may be other intervening layers, areas, or plates may be present there between. However, when a layer, area, or plate is referred to as being "directly on" another layer, area, or plate, intervening layers, areas, or plates may be absent there between. Further when a layer, area, or plate is referred to as being "below" another layer, area, or plate, a person of ordinary skill in the art should understand the layer, area of plate may be directly below another layer, area, or plate, or intervening layers, areas, or plates may be present there between. Conversely, when a layer, area, or plate is referred to as being "directly below" another layer, area, or plate, intervening layers, areas, or plates may be absent there between.

The spatially relative terms "below", "beneath", "less", "above", "upper" and the like, may be used herein for ease of description to describe the relations between one element or component and another element or component as illustrated in the drawings. A person of ordinary skill in the art should understand and appreciate that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed there between. It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and can be defined as being within an acceptable range of deviation for the particular value as determined by a person of ordinary skill in the art, considering the measurement in question and the error associated with measurement of the particular quantity (i.e., the limitations of the measurement system). For example, "about" may be understood as being within one or more standard deviations, or within ±30%, 20%, 10%, 5% of the stated value.

Unless otherwise defined, all terms used herein (including technical and scientific terms) have the same meaning as commonly understood by those skilled in the art to which this inventive concept pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

The description is directed to specific embodiments of the inventive concept, and a person of ordinary skill in the art should understand and appreciate that the inventive concept is broader than the examples shown and described herein. In the drawings, the same reference numerals may be used for the same or similar elements discussed in the specification.

Hereinafter, a display device according to embodiments of the inventive concept will now be described in detail with reference to FIGS. 1 through 5B. The names of components used in the following description are selected in consideration of their ease of explanation, and may be different from names of actual products.

Figure 2:
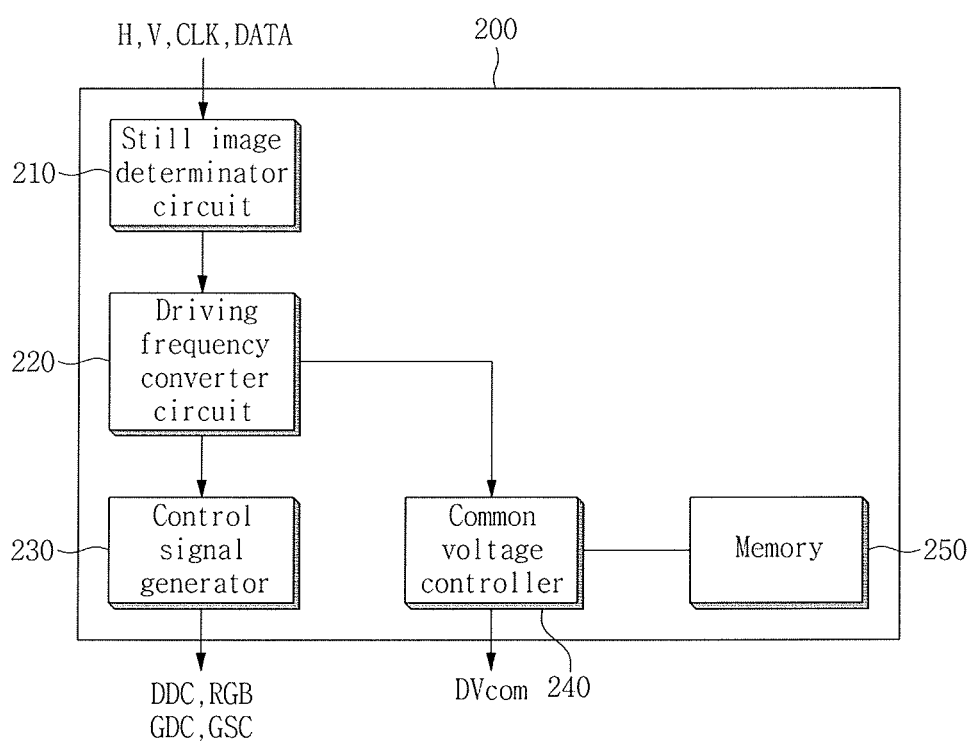
FIG. 2 is a block diagram illustrating a timing controller of a display device according to an embodiment of the inventive concept.
Figure 3:
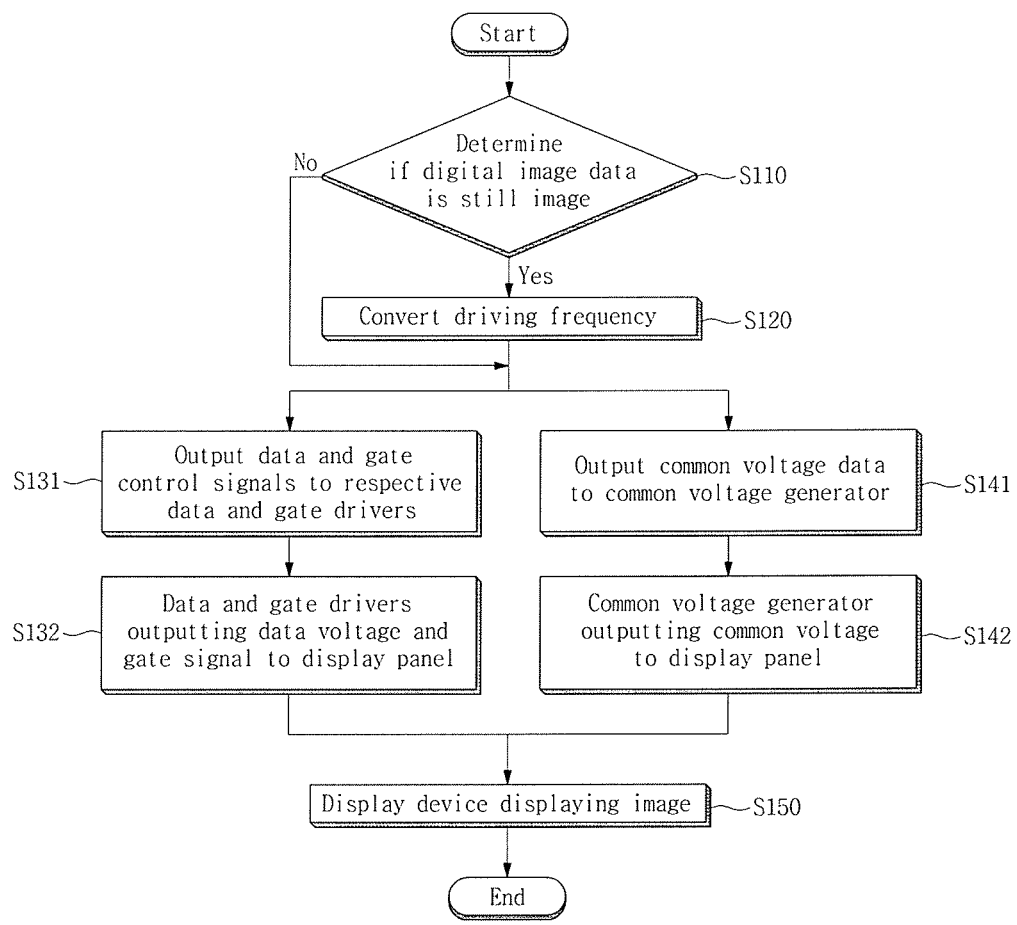
FIG. 3 is a flowchart illustrating an operation of a display device according to an embodiment of the inventive concept.

FIG. 1 is a block diagram illustrating a display device according to an embodiment of the inventive concept, FIG. 2 is a block diagram illustrating a timing controller of a display device according to an embodiment, and FIG. 3 is a flowchart illustrating an operational example of a display device according to an embodiment.

Referring to FIG. 1, the display device according to an embodiment may include a display panel 110, a data driver 120, a gate driver 130, a timing controller (T-CON) 200 and a power management integrated circuit (PMIC) 300.

Although not illustrated, the display device may further include a backlight unit that provides light to the display panel 110, and a pair of polarizers. In addition, in the case where the display panel 110 is a liquid crystal display ("LCD") panel, the LCD panel may be a display panel in one of a vertical alignment (VA) mode, a patterned vertical alignment (PVA) mode, an in-plane switching (IPS) mode, a fringe-field switching (FFS) mode, a plane to line switching (PLS) mode, and the like, but the mode of the display device of the inventive concept is not limited to any specific mode.

The display panel 110 includes a plurality of gate lines GL1 to GLn, a plurality of data lines DL1 to DLm that are insulated from and intersect the plurality of gate lines GL1 to GLn, and a plurality of pixels PX electrically connected to the plurality of gate lines GL1 To GLn and the plurality of data lines DL1 to DLm.

The display panel 110 displays an image comprised of an output of each pixel PX according to a gate signal applied through the plurality of gate lines GL1 to GLn and a data voltage applied through the plurality of data lines DL1 to DLm.

The plurality of gate lines GL1 to GLn are connected to the gate driver 130 and the plurality of data lines DL1 to DLm are connected to the data driver 120.

With continued reference to FIG. 1, the data driver 120 includes a plurality of data driving integrated circuits (ICs) (not illustrated). The data driving ICs receive a data driving control signal DDC and a digital image data signal RGB from the timing controller 200. The data driving ICs may sample the received digital image data signal RGB in response to an instruction in the data driving control signal DDC. The data driving ICs may latch the sampling image data signals corresponding to one horizontal line in every horizontal period, and apply the latched image data signals to the data lines DL1 to DLm. For example, the data driving ICs convert the digital image data signal RGB into analog image data signals, using a driving voltage AVDD and a gamma voltage VGMA input from the PMIC 300 to be described below, and applies the analog image data signals to the data lines DL1 to DLm that are transmitted to the pixels PX.

Each of the plurality of data driving ICs may be implemented as, for example, a tape carrier package (TCP), a chip-on-film (COF), or the like, or may be mounted directly on the display panel 110, just to name some non-limiting examples of various constructions.

The gate driver 130 receives a gate driving control signal GDC and a gate shift clock signal GSC from the timing controller 200 and receives gate driving voltages VGH and VGL from the PMIC 300. The gate driver 130 sequentially generates gate signals which is a pulse signal in response to the gate driving control signal GDC and the gate shift clock GSC and outputs the gate signal to the gate lines GL1 to GLn.

The timing controller 200 receives a digital image data DATA from an external source applied thereto and rearranges the digital image data to output the digital image data signal RGB to the data driver 120. In addition, the timing controller 200 generates the data driving control signal DDC and the gate driving control signal GDC, using horizontal and/or vertical synchronization signals H and V and a clock signal CLK, and applies the data driving control signal DDC to the data driver 120 and the gate driving control signal GDC to the gate driver 130.

In such an embodiment, the data driving control signal DDC may include a source shift clock, a source start pulse, a data enable signal, or the like, and the gate driving control signal GDC may include a gate start pulse, a gate enable signal, or the like.

The timing controller 200 receives the digital image data DATA from an external source applied thereto and determines whether the digital image data DATA is a moving image or a still image. Based on the result, the timing controller 200 generates a common voltage data DVcom and outputs the common voltage data DVcom to a common voltage generator 310 of the PMIC 300, which will be described in detail below.

The PMIC 300 outputs the driving voltage AVDD and the gamma voltage VGMA to the data driver 120, outputs the gate driving voltages VGH and VGL to the gate driver 130, and outputs the common voltage VCOM to the display panel 110.

The PMIC 300 may include the common voltage generator 310 as illustrated in FIG. 1. The common voltage generator 310 receives the common voltage data DVcom from the timing controller 200, generates a common voltage VCOM corresponding to the common voltage data DVcom, and outputs the common voltage VCOM to the display panel 110.

The common voltage generator 310 according to an embodiment is depicted as being included in the PMIC 300, but the inventive concept is not limited thereto. In an embodiment, the common voltage generator 310 may be included in the timing controller 200 or may be formed separately.

FIG. 2 illustrates an example of a timing controller according to an embodiment of the inventive concept. Referring to FIGS. 2 and 3, the timing controller 200 according to an embodiment includes a still image determinator circuit 210, a driving frequency converter circuit 220, a control signal generator 230, a common voltage controller 240 and a memory 250.

With reference to the flowchart shown in FIG. 3, at operation (S110) the still image determinator circuit 210 receives the horizontal and/or vertical synchronization signals H and V, the clock signal CLK and the digital image data DATA externally applied thereto, and identifies an image type, e.g., whether the digital image data DATA is a moving image or a still image.

The still image determinator circuit 210 is configured to analyze the digital image data DATA, and in the case where the display image is identified as a moving image, outputs a moving image control signal to the driving frequency converter circuit 220 (shown in FIG. 2). On the other hand, in the case where the display image is identified as a still image after the analysis on the digital image data DATA, the still image determinator circuit 210 outputs a still image control signal to the driving frequency converter circuit 220. The moving image control signal and the still image control signal may be a low voltage signal and a high voltage signal, respectively.

However, embodiments of the inventive concept are not limited to the above operation, and the still image determinator circuit 210 may set the case in which the digital image data DATA is a moving image as a basic state and, only when the digital image data DATA is a still image, may output the still image control signal to the driving frequency converter circuit 220.

At (S120), the driving frequency converter circuit 220 converts a driving frequency, when receiving the still image control signal.

For example, when the moving image control signal is input, the driving frequency converter circuit 220 sets a first frequency, a predetermined basic frequency, as a driving frequency, and when the still image control signal is input, the driving frequency converter circuit 220 sets a second frequency, which is lower than the first frequency, as a driving frequency. For example, the first frequency, which is the basic frequency, may be in a range from about 60 Hz to about 144 Hz and the second frequency may be in a range from about 1 Hz to about 50 Hz.

In other words, when a still image is input to the display device which is driven by the first frequency, the driving frequency converter circuit 220 converts the driving frequency to the second frequency which is lower than the first frequency. In such an embodiment of the inventive concept, the second frequency may select different values according to the still image. For example, in the case where a still image is input to the display device, which is driven by the first frequency of about 60 Hz, the second frequency may be selected from a range of about 1 Hz to about 50 Hz depending on the flicker value and luminance of the still image.

However, embodiments of the inventive concept are not limited to the aforementioned ranges of driving frequencies. In an alternative embodiment, in the case where the still image determinator circuit 210 outputs only the still image control signal to the driving frequency converter circuit 220 (e.g., does not output the moving image control signal along with still image control signal), when the still image control signal is input, the driving frequency converter circuit 220 converts the driving frequency to the second frequency. Thereafter, in the case where the still image control signal is not input again (e.g., not input after the first input of the still image control signal), the driving frequency may be initialized to the first frequency.

The driving frequency converter circuit 220 outputs the frequency information to the control signal generator 230 and the common voltage controller 240 according to the determined driving frequency.

At operation (S131), the control signal generator 230 receives the frequency information, and outputs a data control signal and a gate control signal corresponding to the frequency information to the data driver 120 and the gate driver 130, respectively. For example, the control signal generator 230 outputs the data control signals DDC and RGB including the data driving control signal DDC and the digital image data signal RGB to the data driver 120, and outputs the gate control signals GDC and GSC including the gate drive control signal GDC and the gate shift clock GSC to the gate driver 130.

At operation (S132), the data driver 120 receives the data control signals DDC and RGB from the control signal generator 230 of the timing controller 200, and outputs the data voltage including the driving voltage AVDD and the gamma voltage VGMA to the display panel 110, and the gate driver 130 receives the gate control signals GDC and GSC from the control signal generator 230 of the timing controller 200, and outputs the gate signal to the display panel 110.

At operation (S141), the common voltage controller 240 receives the frequency information and outputs the common voltage data DVcom corresponding to the frequency information to the common voltage generator 310 of the PMIC 300. The common voltage controller 240 receives the common voltage data DVcom from the memory 250.

The memory 250 includes various common voltage data DVcom according to the frequency information. The common voltage data DVcom is set so that ripple components of the data voltage according to the driving frequency may be compensated for, which will be described in detail below.

The memory 250 may be, or include, a lookup table having the frequency information and the common voltage data DVcom as variables. However, embodiments of the inventive concept are not limited thereto, and the memory 250 may be a lookup table having the frequency information, gray scale information and the common voltage data DVcom as variables. Accordingly, the common voltage controller 240 may output various common voltage data DVcom according to not only the driving frequency but also the gray scale value.

At operation (S142), the common voltage generator 310 receives the common voltage data DVcom from the timing controller 200 and outputs the common voltage VCOM to the display panel 110.

At operation (S150), the display device displays an image according to the data voltage, the gate signal and the common voltage VCOM applied to the display panel 110.

The display device according to an embodiment selectively outputs the common voltage according to the driving frequency, thereby substantially preventing the occurrence of flickering during low frequency driving.

FIGS. 4A, 4B, 4C and 4D are views illustrating examples of waveforms of a data voltage and a common voltage depending on the driving frequency according to an embodiment of the inventive concept. In such an embodiment, a data voltage applied to the first data line DL1 of FIG. 1 is defined as a first data voltage Vdata1 and a data voltage applied to the second data line DL2 of FIG. 1 is defined as a second data voltage Vdata2.

Figure 4A:
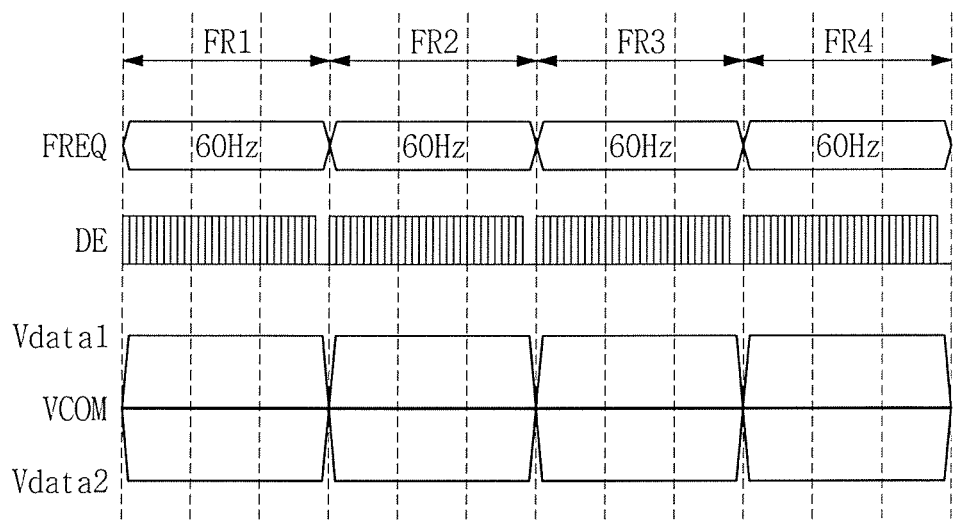
FIGS. 4A, 4B, 4C and 4D are views illustrating waveforms of a data voltage and a common voltage depending on a driving frequency.

FIG. 4A illustrates waveforms of the first data voltage Vdata1, the second data voltage Vdata2 and the common voltage when the driving frequency is about 60 Hz.

The first and second data voltages Vdata1 and Vdata2 are applied to the first and second data lines DL1 and DL2 (FIG. 1) corresponding to a data enable signal DE. When the driving frequency FREQ is about 60 Hz, the first and second data voltages Vdata1 and Vdata2 are refreshed every frame.

A polarity of the first data voltage Vdata1 applied to the first data line DL1 may change every frame. For example, the first data voltage Vdata1 maintains a positive polarity in odd-numbered frame periods FR1 and FR3, while the first data voltage Vdata1 maintains a negative polarity in even-numbered frame periods FR2 and FR4.

With continued reference to FIG. 4A, a polarity of the second data voltage Vdata2 applied to the second data line DL2 may change every frame. In such an embodiment, the first data voltage Vdata1 and the second data voltage Vdata2 have opposite polarities from each other in a substantially same frame period. For example, the second data voltage Vdata2 maintains a negative polarity in the odd-numbered frame periods FR1 and FR3 in which the first data voltage Vdata1 maintains the positive polarity and the second data voltage Vdata2 maintains a positive polarity in the even-numbered frame periods FR2 and FR4, in which the first data voltage Vdata1 maintains the negative polarity.

A polarity of a data voltage applied to odd-numbered data lines DL1, DL3, DL5, . . . , DL2k-1 changes in a substantially same manner as the first data voltage Vdata1 described above, and a polarity of a data voltage applied to even-numbered data lines DL2, DL4, DL65, DL2k changes in a substantially same manner as the second data voltage Vdata1 described above.

The first data voltage Vdata1 may include positive data voltages of a high gray scale and the second data voltage Vdata2 may include negative data voltages of a high gray scale. Accordingly, the first data voltage Vdata1 and the second data voltage Vdata2 may have a substantially equal absolute value in a substantially same horizontal period, while a transition direction of the first data voltage Vdata1 and a transition direction of the second data voltage Vdata2 are opposite to each other. For example, as illustrated in FIG. 4A, in the first frame period FR1 in which the first gate line GL1 is driven, the first data voltage Vdata1 and the second data voltage Vdata2 have a substantially equal level, but only different in polarity, and in such an embodiment, the first data voltage Vdata1 begins in the first frame period FR1 by transitioning in a rising direction, while the second data voltage Vdata2 begins in the first frame period FR1 by transitioning in a falling direction. In an embodiment of the inventive concept, in the same first frame period FR1, a data voltage of the entirety of the odd-numbered data lines DL1, DL3, DL5, . . . , DL2k-1 transitions in a substantially same manner as the first data voltage Vdata1, and a data voltage of the entirety of the even-numbered data lines DL2, DL4, DL6, . . . , DL2k transitions in a substantially same manner as the above-described second data voltage Vdata2.

As such, a ripple of the common voltage VCOM may be substantially minimized due to the data voltages having a substantially same level and transitioning in opposite directions. For example, a rising ripple of the common voltage generated by the first data voltage Vdata1 and the data voltages of the odd-numbered data lines DL1, DL3, DL5, . . . , DLj-1 is cancelled out by a falling ripple of the common voltage VCOM generated by the second data voltage Vdata2 and the data voltages of the even-numbered data lines DL2, DL4, DL6, . . . , DLj. Accordingly, the ripples of the common voltage VCOM may be substantially almost removed. Accordingly, the distortion of the common voltage VCOM may be substantially minimized. Moreover, the occurrence of horizontal crosstalk may be substantially minimized.

In addition, when the driving frequency FREQ is about 60 Hz, the data voltages are refreshed every frame, and thus a decrease of each data voltage during the frame period may be substantially minimized. Accordingly, the flickering phenomenon, e.g., a phenomenon in which the luminance difference is recognized, may be substantially prevented.

Figure 4B:
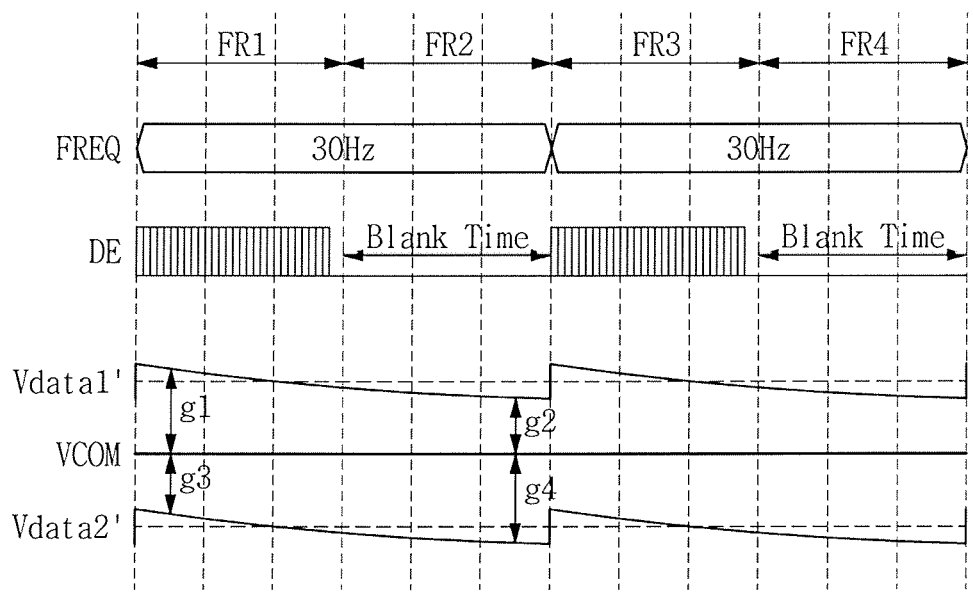

FIG. 4B illustrates waveforms of the first data voltage, the second data voltage and the common voltage before the common voltage is compensated for when the driving frequency is about 30 Hz.

First and second data voltages Vdata1' and Vdata2' are applied to the first and second data lines DL1 and DL2 corresponding to the data enable signal DE. When the driving frequency FREQ is about 30 Hz, the first and second data voltages Vdata1' and Vdata2' are not refreshed every frame, dissimilar to the case where the driving frequency FREQ is about 60 Hz. For example, a blank period occurs in which the data enable signal DE is not output.

In such an embodiment, it is desirable that the first and second data voltages Vdata1' and Vdata2' of a previous frame be maintained during the blank period. However, due to a leakage current of the TFT, residual DC components, or the like, as described in FIG. 4B, the first and second data voltages Vdata1' and Vdata2' decrease over time.

For example, the first and second data voltages Vdata1' and Vdata2' are not refreshed for a relatively long time during the low frequency driving of the display device such that the first and second data voltages Vdata1' and Vdata2' decrease over time. Accordingly, a voltage difference between the first and second data voltages Vdata1' and Vdata2' and the common voltage VCOM is not constant, such that the luminance change may be recognized.

For example, as illustrated in 4B, when a voltage difference between the first data voltage Vdata1' and the common voltage VCOM immediately after the first data voltage Vdata1' of a positive polarity is refreshed is defined as a first gap g1 and, after some time elapses, a voltage difference between the first data voltage Vdata1' and the common voltage VCOM immediately before a succeeding refresh is defined as a second gap g2, the first gap g1 is greater than the second gap g2. In addition, when a voltage difference between the second data voltage Vdata2' and the common voltage VCOM immediately after the second data voltage Vdata2' of a negative polarity is refreshed is defined as a third gap g3 and, after some time elapses, a voltage difference between the second data voltage Vdata2' and the common voltage VCOM immediately before a succeeding refresh is defined as a fourth gap g4, the third gap g3 is less than the fourth gap g4. Accordingly, a flickering phenomenon may occur due to a change in luminance.

Although it is illustrated that the first data voltage Vdata1' maintains the positive polarity and the second data voltage Vdata2' maintains the negative polarity according to this embodiment, a person of ordinary skill in the art should understand that the inventive concept is not limited thereto. In an embodiment of the inventive concept, the first and second data voltages Vdata1' and Vdata2' may have different polarities at every integer multiple of the frame period. For example, the first and second data voltages Vdata1' and Vdata2' may have a reverse polarity every two frame periods, which is twice the frame period.

Figure 4C:
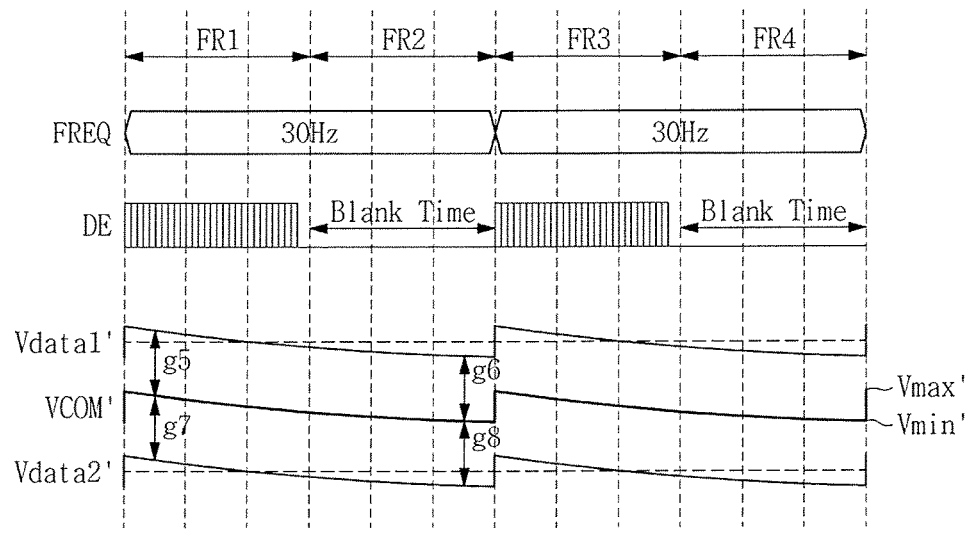
Figure 4D:
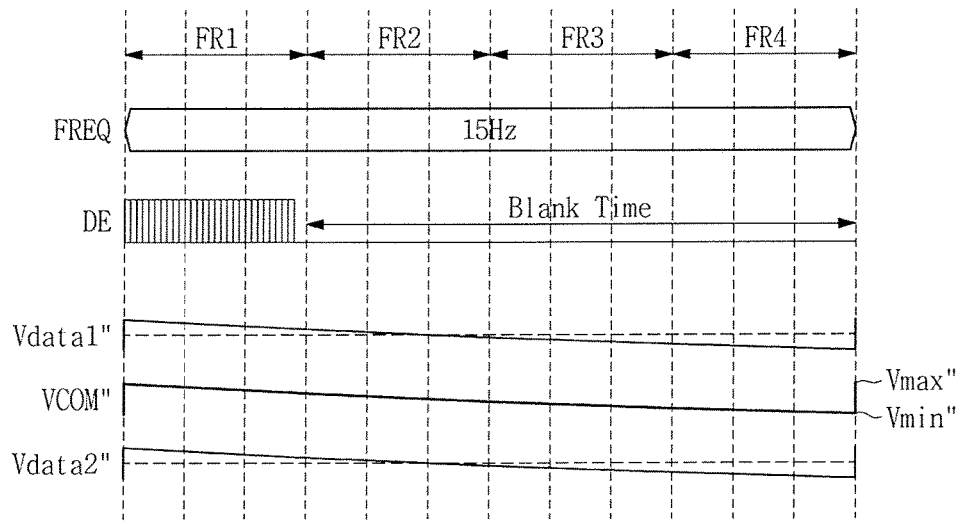

FIG. 4C illustrates waveforms of the first data voltage, the second data voltage and the common voltage after compensating for the common voltage according to an embodiment when the driving frequency is about 30 Hz. FIG. 4D illustrates waveforms of the first data voltage, the second data voltage and the common voltage after compensating for the common voltage according to an embodiment when the driving frequency is about 15 Hz.

The common voltage of the display device according to an embodiment of the inventive concept is selectively output according to the driving frequency. The common voltage selected and the output in the low driving frequency is defined as a compensated common voltage. According to an embodiment of the inventive concept, an output timing of the compensated common voltage may be synchronized with an output timing of the data voltage.

Compensated common voltages VCOM' and VCOM" (shown in FIGS. 4C and 4D, respectively), have inclined waveforms within an integer multiple of the frame period. For example, as illustrated in FIGS. 4C and 4D, when the driving frequency FREQ is about 30 Hz, the compensated common voltage VCOM' has an inclined waveform which gradually decreases within two frame periods, which is twice the frame period, and when the driving frequency FREQ is about 15 Hz, the compensated common voltage VCOM" has an inclined waveform which gradually decreases within four frame periods, which is four times the frame period. A person of ordinary skill in the art should understand and appreciate that the term "gradually" may be understood in this embodiment to refer to a substantially similar rate of decrease or increase. For example, with reference to FIG. 4C, it can be seen that VCOM' decreases at a similar rate over the duration of two frame periods. While the waveform VCOM' shown and described in an embodiment of the inventive concept is not a linearly decreasing (or linearly increasing), there is shown a continuous decrease that has a substantially constant rate of decrease of the waveform over the two frame periods FR1 and FR2 (shown in FIG. 4C).

In such an embodiment of the inventive concept, to maintain a voltage difference between the first and second data voltages Vdata1', Vdata2', Vdata1" and Vdata2" (shown in FIGS. 4C and 4D, respectively constant), the compensated common voltages VCOM' and VCOM" are output, having waveforms substantially similar to each corresponding one of the first and second data voltages Vdata1', Vdata2', Vdata1" and Vdata2". Accordingly, in the display device according to an embodiment of the inventive concept, the first data voltage Vdata1' and Vdata1", the second data voltage Vdata2' and Vdata2", and the compensated common voltage VCOM' and VCOM", are depicted as having inclined waveforms that gradually decrease, but embodiments are not limited thereto. In an embodiment, the first data voltage Vdata1' and Vdata1", the second data voltage Vdata2' and Vdata2" and the compensated common voltage VCOM' and VCOM" may have inclined waveforms that gradually increase.

As illustrated FIG. 4C, when the driving frequency FREQ is about 30 Hz, the first and second data voltages Vdata1' and Vdata2' are not refreshed for a relatively long time as compared to the case where the driving frequency FREQ is about 60 Hz, and thus a value of the first and second data voltages Vdata1' and Vdata2' are reduced at the 30 Hz driving frequency. In such an embodiment, the voltage difference between the first and second data voltages Vdata1' and Vdata2' and the compensated common voltage VCOM' may be substantially minimized by compensating for the common voltage VCOM, thereby preventing the luminance difference from being recognized. In one example, the luminance difference was decreased by almost ¾ s (e.g., FIGS. 5A and 5B).

For example, as illustrated in 4C, when a voltage difference between the first data voltage Vdata1' and the compensated common voltage VCOM' immediately after the first data voltage Vdata1' of a positive polarity is refreshed is defined as a fifth gap g5 and, after some time elapses, a voltage difference between the first data voltage Vdata1' and the common voltage VCOM' immediately before a succeeding refresh is defined as a sixth gap g6, the fifth gap g5 is substantially equal to the sixth gap g6. In addition, when a voltage difference between the second data voltage Vdata2' and the compensated common voltage VCOM' immediately after the second data voltage Vdata2' of a negative polarity is refreshed is defined as a seventh gap g7 and, after some time elapses, a voltage difference between the second data voltage Vdata2' and the common voltage VCOM' immediately before a succeeding refresh is defined as an eighth gap g8, the seventh gap g7 is substantially equal to the eighth gap g8. In such an embodiment of the inventive concept, the fifth, sixth, seventh and eighth gaps g5, g6, g7 and g8 may all be substantially equal to each other. Accordingly, the display device according to an embodiment of the inventive concept may substantially prevent the occurrence of the flickering phenomenon that may occur due to the luminance change.

As illustrated in FIG. 4D, when the driving frequency FREQ is about 15 Hz, the first and second data voltages Vdata1" and Vdata2" are not refreshed for a relatively long time period as compared to the case where the driving frequency FREQ is about 30 Hz, and thus the first and second data voltages Vdata1" and Vdata2" have a larger decrease than at the driving frequency of 30 Hz. In such an embodiment, a voltage difference between the first and second data voltages Vdata1" and Vdata2" and the compensated common voltage VCOM" may be substantially minimized by compensating for the common voltage VCOM, thereby substantially preventing the luminance difference from being recognized.

As the driving frequency FREQ is reduced, the difference between a maximum value and a minimum value of the compensated common voltages VCOM' and VCOM" becomes greater. For example, as illustrated in FIGS. 4C and 4D, if a maximum value of the compensated common voltage VCOM' when the driving frequency FREQ is about 30 Hz is defined as a first maximum value Vmax', a minimum value of the compensated common voltage VCOM' when the driving frequency FREQ is about 30 Hz is defined as a first minimum value Vmin', a maximum value of the compensated common voltage VCOM' when the driving frequency FREQ is about 15 Hz is defined as a second maximum value Vmax", and a minimum value of the compensated common voltage VCOM' when the driving frequency FREQ is about 15 Hz is defined as a second minimum value Vmin", a difference between the first maximum value Vmax' and the first minimum value Vmin' is less than a difference between the second maximum value Vmax" and the second minimum value Vmin". For example, the first maximum value Vmax' may be about 4.0 V, the first minimum value Vmin' may be about 3.6 V, the second maximum value Vmax" may be about 4.0 V and the second minimum value Vmin" may be about 3.3 V.

Accordingly, the display device according to an embodiment may effectively prevent the flickering phenomenon from occurring in the display device driven by various driving frequencies by outputting the common voltage having different inclined waveforms according to the driving frequency. The inclined waveforms of the common voltage may compensate for the decrease in data voltage that can be associated with the display flickering, particularly at relatively lower driving frequencies.

Figure 5A:
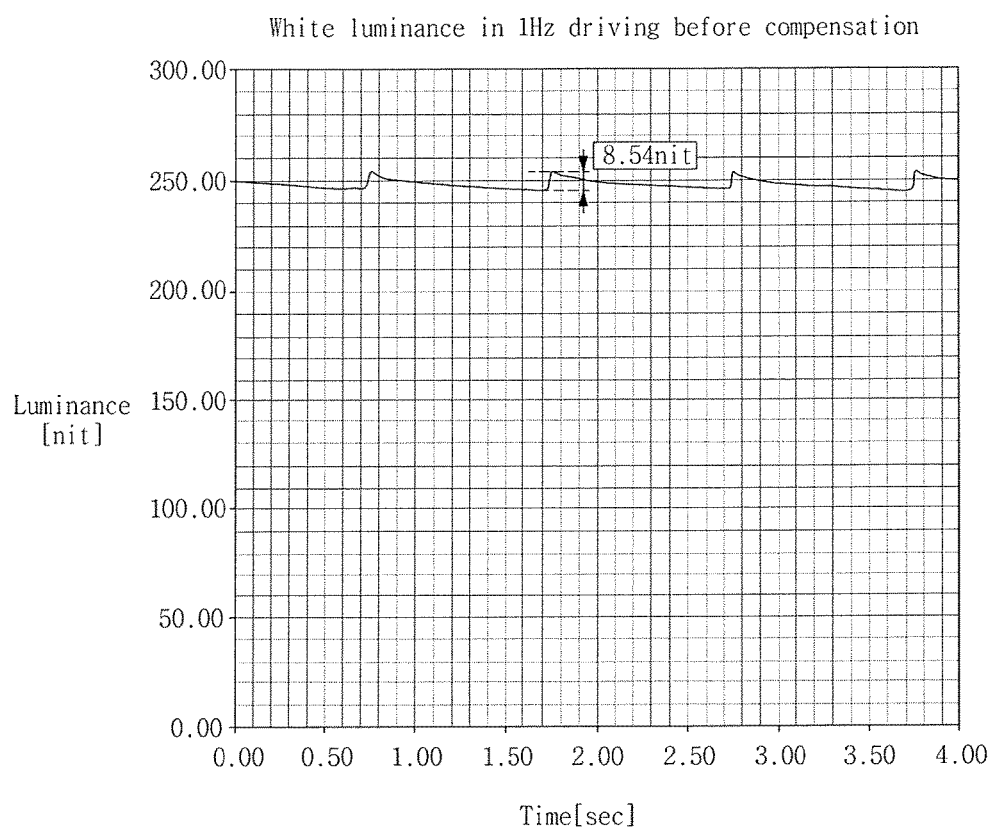
Figure 5B:
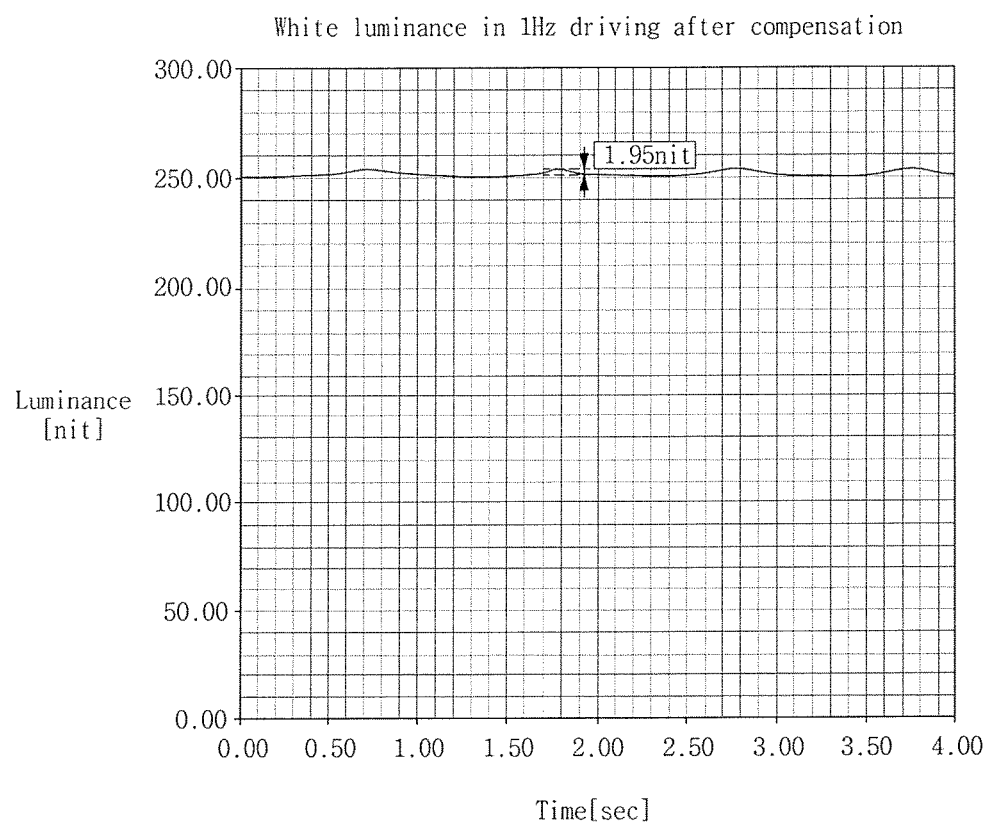
FIG. 5B is a view illustrating a luminance waveform after the common voltage is compensated for according to an embodiment of the inventive concept.

FIG. 5A is a view illustrating a luminance waveform before the common voltage is compensated for, and FIG. 5B is a view illustrating a luminance waveform after the common voltage is compensated for according to an embodiment of the inventive concept. In this embodiment, the display panel is driven in a normally black mode and the luminance waveform corresponds to a luminance waveform of a case where the display device is driven by a driving frequency of about 1 Hz and a data voltage corresponding to a white gray scale is applied. A person of ordinary skill in the art should understand and appreciate that the inventive concept is not limited to the aforementioned mode, driving frequency and gray scale.

Referring to FIGS. 5A and 5B, a luminance change before compensating for the common voltage VCOM is about 8.54 nit and a luminance change after compensating for the common voltage VCOM according to an embodiment is about 1.95 nit. Thus, the variance in brightness is reduced in this example by approximately 6.59 nit, which is a significant reduction. Accordingly, the display device according to an embodiment may significantly reduce the flickering that may occur due to an abrupt change in luminance during the low frequency driving.

As set forth hereinabove, a display device, such as an LCD device may substantially prevent the flickering phenomenon by compensating for the common voltage according to a corresponding driving frequency.

While the inventive concept has been illustrated and described with reference to the embodiments thereof, it will be apparent to those of ordinary skill in the art that various changes in form and detail may be made thereto without departing from the spirit and scope of the inventive concept.

What is claimed is:

1. A display device comprising:
a display panel;
a driving frequency converter circuit configured to convert a driving frequency according to an input image data;
a common voltage controller configured to control output of a common voltage data corresponding to the driving frequency;
a common voltage generator configured to receive the common voltage data and generate a common voltage and output the common voltage to the display panel,
wherein the generated common voltage has an inclined waveform within an integer multiple of a frame period, and a difference between a maximum value and a minimum value of the common voltage increases as the driving frequency decreases.

2. The display device according to claim 1, wherein the display panel includes:
a plurality of gate lines;
a plurality of data lines insulated from and intersecting the plurality of gate lines;
a plurality of pixels electrically connected to the plurality of gate lines and the plurality of data lines;
wherein the display panel displays an image comprised of an output of each pixel according to a gate signal applied through the plurality of gate lines, and a data voltage applied through the plurality of data lines, and
wherein a value of the common voltage decreases at a substantially similar rate during the integer multiple of the frame period.

3. The display device according to claim 1, wherein a value of the common voltage gradually decreases within the integer multiple of the frame period.

4. The display device according to claim 1, wherein a value of the common voltage gradually increases within the integer multiple of the frame period.

5. The display device according to claim 1, wherein the integer multiple of the frame period increases as the driving frequency decreases.

6. The display device according to claim 1, wherein the display panel is driven by a first frequency when the input image data is a moving image data, and driven by a second frequency when the input image data is a still image data.

7. The display device according to claim 6, wherein the first frequency is greater than the second frequency.

8. The display device according to claim 6, wherein a difference between a maximum value and a minimum value of the common voltage increases as the second frequency decreases.

9. The display device according to claim 1, further comprising a lookup table having the driving frequency and the common voltage data as variables.

10. The display device according to claim 1, further comprising a lookup table having the driving frequency, a gray scale and the common voltage data as variables.

11. The display device according to claim 1, further comprising:
a power management circuit unit configured to output a driving voltage and a gamma voltage;
a timing controller configured to output an image data signal and a driving control signal;
a data driver configured to convert the image data signal into a data voltage signal based on the driving voltage, the gamma voltage and the driving control signal; and
a gate driver configured to output a gate signal based on the driving voltage and the driving control signal.

12. The display device according to claim 11, wherein the data voltage signal has a different polarity at every integer multiple of the frame period.

13. The display device according to claim 11, wherein the data voltage signal and the common voltage are refreshed at every integer multiple of the frame period.

14. A display device comprising:
a display panel including a plurality of gate lines, and a plurality of data lines insulated from and intersecting the plurality of gate lines, and a plurality of pixels electrically connected to the plurality of gate lines and the plurality of data lines;
a timing controller circuit configured to receive a digital image data and identify whether the digital image data comprises a still image data or a moving image data;
a data driver circuit configured to convert a digital image data signal into analog image data signals applied to the plurality of data lines;
a gate driver circuit configured to generate gate signals in response output to the plurality of gate lines;
a power management integrated circuit (PMIC) configured to: output a driving voltage and a gamma voltage to the data driver circuit, output gate driving voltages to the gate driver circuit, and output a common voltage to the display panel;
wherein the common voltage has an inclined waveform within an integer multiple of a frame period, after the analog image data signals received by the plurality of pixels are refreshed for a first frame in the integer multiple of the frame period without being refreshed for other frame in the integer multiple of the frame period.

15. The display device according to claim 14, further comprising:
a common voltage generator that generates a common voltage data having the inclined waveform; and
wherein the timing controller circuit is configured to receive the digital image data from an external source, and generate a common voltage data that is output to the common voltage generator; and
the timing controller circuit includes a still image determinator circuit that identifies whether the digital image data comprises a still image or a moving image, and a common voltage controller that receives a frequency information and outputs the common voltage data corresponding to the frequency information to the common voltage generator.

16. The display device according to claim 15, further comprising a memory, and wherein a common voltage controller retrieves from the memory a particular common voltage data corresponding to a particular driving frequency from among a plurality of driving frequencies based on the frequency information.

17. The display device according to claim 16, wherein the memory comprises a lookup table including at least the frequency information, gray scale information and the common voltage data as variables.

18. The display device according to claim 16, wherein the common voltage data comprises different inclined waveforms according to a corresponding driving frequency identified in the frequency information, respectively.

19. A display device comprising:
a display panel including a plurality of gate lines, and a plurality of data lines insulated from and intersecting the plurality of gate lines, and a plurality of pixels electrically connected to the plurality of gate lines and the plurality of data lines;
a timing controller circuit configured to receive a digital image data and identify whether the digital image data comprises a still image data or a moving image data;
a data driver circuit configured to convert a digital image data signal into analog image data signals a plied to the plurality of data lines;
a gate driver circuit configured to generate gate signals in response output to the plurality of gate lines;
a power management integrated circuit (PMIC) configured to: output a driving voltage and a gamma voltage to the data driver circuit, output gate driving voltages to the gate driver circuit, and output a common voltage to the display panel;
wherein the common voltage has an inclined waveform within an integer multiple of a frame period; and
wherein the display panel is driven by a first frequency when the digital image data is a moving image data and driven by a second frequency when the digital image data is a still image data, and a difference between a maximum value and a minimum value of the common voltage increases as the second frequency decreases.

20. A non-transitory machine readable medium having stored thereon executable instructions to cause a display device to perform operations comprising:
converting, by a driving frequency converter circuit, a driving frequency according to whether input image data is a still image;
providing, by a common voltage controller, output data and gate control signals to data drivers and gate drivers including the driving frequency;
providing a common voltage to a display panel in which the common voltage corresponds to the driving frequency, wherein the common voltage has an inclined waveform within an integer multiple of a frame period of an image displayed by the display panel, and wherein a difference between a maximum value and a minimum value of the common voltage increases as the driving frequency decreases.

* * * * *